United States Patent
Breddermann

(10) Patent No.: US 11,860,299 B2
(45) Date of Patent: Jan. 2, 2024

(54) METHOD AND DEVICE FOR GENERATING A MODULATED CONTINUOUS-WAVE RADAR SIGNAL

(71) Applicant: HELLA GMBH & CO. KGAA, Lippstadt (DE)

(72) Inventor: Tobias Breddermann, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 383 days.

(21) Appl. No.: 16/810,461

(22) Filed: Mar. 5, 2020

(65) Prior Publication Data
US 2020/0241110 A1 Jul. 30, 2020

Related U.S. Application Data

(63) Continuation of application No. PCT/EP2018/073102, filed on Aug. 28, 2018.

(30) Foreign Application Priority Data

Sep. 5, 2017 (DE) ...................... 10 2017 120 368.0

(51) Int. Cl.
*G01S 7/35* (2006.01)
*G01S 13/931* (2020.01)
*G01S 7/40* (2006.01)

(52) U.S. Cl.
CPC ............ *G01S 7/354* (2013.01); *G01S 13/931* (2013.01); *G01S 7/356* (2021.05); *G01S 7/403* (2021.05); *G01S 7/4034* (2021.05)

(58) Field of Classification Search
None
See application file for complete search history.

(56) References Cited

U.S. PATENT DOCUMENTS

| | | | |
|---|---|---|---|
| 6,816,107 B2 * | 11/2004 | Pleva | H01Q 25/00 342/28 |
| 2008/0100510 A1 * | 5/2008 | Bonthron | G01S 13/89 342/373 |

(Continued)

FOREIGN PATENT DOCUMENTS

| | | |
|---|---|---|
| DE | 10 2015 116 441 A1 | 3/2017 |
| DE | 10 2016 203 160 A1 | 8/2017 |

OTHER PUBLICATIONS

Matthias Kronauge, "Waveform Design for Continuous Wave Radars," Dissertation, pp. 1-152 (Aug. 11, 2014)—English Abstract.

*Primary Examiner* — Marcus E Windrich
(74) *Attorney, Agent, or Firm* — Muncy, Geissler, Olds & Lowe, P.C.

(57) ABSTRACT

A method for measuring an elevation angle and/or azimuth angle with an antenna array. Identical transmitted signals that are formed of successive linear-frequency-modulated ramps are transmitted through the transmitting antennas of the antenna array using time division multiplexing, wherein the time division multiplexing is achieved through alternating attenuation of the signals transmitted by the transmitting antennas. Echoes of the transmitted signals are received by the receiving antennas and are down-converted to a baseband and sampled. The down-converted and sampled echoes are transformed by an FFT into a 2D image domain. Phase differences are determined from the image data, and, in order to compensate for a systematic error present because of the lack of separation of the two transmitted signals, an error-compensated elevation angle and/or an error-compensated azimuth angle is determined by means of a compensation.

8 Claims, 8 Drawing Sheets

(56) References Cited

U.S. PATENT DOCUMENTS

| | | | |
|---|---|---|---|
| 2012/0119939 A1* | 5/2012 | Mizutani | G01S 13/58 342/128 |
| 2013/0016003 A1* | 1/2013 | Stirling-Gallacher | H01Q 3/26 342/372 |
| 2019/0011532 A1 | 1/2019 | Loesch et al. | |

* cited by examiner

METHOD AND DEVICE FOR GENERATING A MODULATED CONTINUOUS-WAVE RADAR SIGNAL

This nonprovisional application is a continuation of International Application No. PCT/EP2018/073102, which was filed on Aug. 28, 2018, and which claims priority to German Patent Application No. 10 2017 120 368.0, which was filed in Germany on Sep. 5, 2017, and which are both herein incorporated by reference.

BACKGROUND OF THE INVENTION

Field of the Invention

The present invention relates to a method and device for generating a modulated continuous-wave radar signal.

Description of the Background Art

It is no longer possible to imagine modern motor vehicles without radar sensors for detecting obstacles and other road users at close and long ranges. It is also necessary for many applications such as intersection assist systems, lane change assist systems, Rear Traffic Alert, etc., to detect objects in the road space such as other vehicles, pedestrians, buildings, signs, etc. Experts speak of object initialization, object validation, and the selection of relevant objects, which are entered into a so-called object list. Object initialization takes place on the basis of a target list (relevant reflections), which are detected by means of a suitable modulation scheme.

It is known from the literature, for example the dissertation "Waveform Design for Continuous Wave Radars," Matthias Kronauge, ISBN 978-3-95404-775-8, 2014, to determine target parameters of objects to be detected with a linear frequency-modulated continuous wave radar (LFMCW), which is to say using ramps in rapid succession (described in the literature as fast chirps, rapid chirps, rapid chirp sequences). The target parameters are primarily the relative velocity, range, azimuth angle, and elevation angle.

In determining the object parameters or target parameters according to a method that uses a linear frequency-modulated continuous wave radar, a number of N frequency ramps with a duration of $T_1/N$ is transmitted successively within a measurement cycle having a duration of $T_1$ (see FIG. 1). In this process, the transmit frequency of the frequency ramps is changed linearly within the transmission bandwidth B (linear frequency modulation). The processing of the data extracted from the echoes received simultaneously in the time $T_1$ takes place subsequently in the time span $T_2-T_1$, so that the overall cycle corresponds to a duration $T_2$.

If the targets to be detected are identified using the radar signals, a target list is created and passed to a target tracking algorithm (tracking), which generates an object list on the basis of this target list.

A 77 GHz LFMCW radar of the applicant has two or three transmitting antennas and four receiving antennas. A block diagram of the 77 GHz LFMCW radar is shown in FIG. 2.

The receiving antennas are arranged equidistantly at a spacing $d_R$ in the x-direction. The transmitting antennas have both a spacing $d_{Tx}$ in the x-direction and a spacing $d_{Ty}$ in the y-direction, and operate using time division multiplexing (alternating, time-delayed transmission of identical signals).

The reflected signal, which is to say the radar echo, is received in the receiving antennas. Each receiving antenna provides a received signal, which is initially down-converted to the baseband with the transmitted signal and sampled in the receivers that follow the receiving antennas. Each down-converted and sampled received signal is present at the time $T_1$ stored in an M×N matrix (M sampled values per ramp, N frequency ramps). The echo represents a superposition of reflections from relevant targets and reflections from unwanted targets, which are also referred to in the radar field as clutter (unwanted echoes caused by reflections at the ground, peripheral construction, and from rain, etc.).

After down-conversion and storage, a transformation, usually a Fast Fourier Transform (FFT), of the 2D baseband signals thus stored then takes place into a 2D image domain, usually referred to as a 2D frequency domain.

After detection, a signal formed of two base frequencies $f_1$ (first dimension) and $f_2$ (second dimension) is therefore produced for a relevant target. The frequency $f_1$ depends solely on the range R of the target, and the frequency $f_2$ depends solely on the relative velocity v.

In addition, the time of flight difference of the reflected signal, and from that the azimuth angle, is determined by means of the difference between the phases of the complex values of the 2D image domains associated with the four receiving antennas at one point of a frequency tuple that is to be evaluated.

The difference between the phases of the complex values of the 2D image domains associated with the two transmitting antennas at the location of a receiving antenna makes it possible, moreover, to measure the elevation angle based on the spatially offset arrangement ($d_{Tx}$, $d_{Ty}$, see FIG. 2) of the transmitting antennas.

The raw target parameters thus determined (together with additional information such as, e.g., the signal level and the reliability of the generated values) constitute a so-called raw target, from which an object or target can be formed by means of tracking algorithms in a further processing step.

Elevation angle measurement represents one component of the applicant's future 77 GHz radar sensor. Advantages of such a measurement include, for example, the separation of objects in the elevation direction (e.g., a car under a bridge), the correction of the distance measurement through projection onto the x-z plane (e.g., more accurate detection of peripheral development), and a more accurate measurement of the azimuth angle in the lateral region (necessary in particular for Rear Cross Traffic Alert (RCTA), which is to say detection of cross-traffic to the rear).

For each detected raw target within a measurement cycle, the measurement with the first transmitting antenna Tx1 provides an (average) phase difference $\Delta\varphi_1$ between the receiving antennas, which is dependent upon both the azimuth angle and the elevation angle of the target/object. In systems with one transmitting antenna, an error in azimuth angle measurement thus arises, especially at the edge of the detection area (RCTA area).

For each detected raw target within a measurement cycle, the measurement with the second transmitting antenna Tx2 provides a phase difference $\Delta\varphi_2$ between the two transmitting antennas at the location of a receiving antenna, which results from the target/object position and the geometric arrangement of the transmitting antennas.

Using these measurements $\Delta\varphi_1$, $\Delta\varphi_2$, the elevation angle can be calculated as follows (the values $d_{Tx}$, $d_{Ty}$, $d_R$ are determined by the antenna array, the value k is the wave number of the electromagnetic wave):

$$\Delta\varphi_E = \Delta\varphi_2 - \frac{d_{Tx}}{d_R}\Delta\varphi_1 \rightarrow \Phi_E = \sin^{-1}\left(\frac{\Delta\varphi_E}{kd_{Ty}}\right), \quad (1)$$

where k designates the wave number of the electromagnetic wave.

The azimuth angle then results from the phase corrected with the elevation angle $\Phi_E$:

$$\Delta\varphi_A = \frac{\Delta\varphi_1}{\cos(\Phi_E)} \rightarrow \Phi_A = \sin^{-1}\left(\frac{\Delta\varphi_A}{kd_R}\right). \quad (2)$$

To improve the signal-to-noise ratio, the phase differences between the transmitting antennas measured at the four receiving antennas can be averaged before analysis using Equation (1) for elevation angle estimation (6 dB SNR increase).

An accurate calculation of the elevation angle and azimuth angle using Equations (1) and (2) requires an exact separation of the transmitted signals. As already mentioned, this separation takes place in the applicant's 77 GHz radar sensor by means of transmission using time division multiplexing.

However, the monolithic microwave circuit (MMIC) used does not allow direct switchover of the transmitting antennas, but only attenuation of the "unwanted" transmitted signal by approximately 20 dB. The coherent superposition of the desired transmitted signal and the unwanted transmitted signal or signals results in a phase distortion, and consequently an erroneous measurement of the two angles (see FIG. 3).

In addition to the elevation angle measurement, a digital beamforming in both the azimuth and elevation directions is to be accomplished by means of the two transmitting antennas in order to achieve a situation-dependent directivity. This change in the area illuminated by the sensor during time of flight permits an application-dependent focusing of the main lobe, e.g., a strong focusing in the elevation direction in the far field, for example to detect preceding or approaching vehicles when driving on a road or highway, or a weak focusing in the near field, for example to detect obstacles in different directions when entering or leaving a parking space.

The strength of the focusing can be controlled by means of an attenuation coefficient that attenuates the amplitude of the transmitted signal from the second transmitting antenna relative to the amplitude of the transmitted signal from the first transmitting antenna. Direct switchover of the transmitting antennas, which is not possible with the MMIC used, is therefore actually undesirable in the case of digital beamforming.

Even in the case of digital beamforming by means of attenuation of the transmitted signal from one of the transmitting antennas, an accurate calculation of the elevation angle and azimuth angle using Equations (1) and (2) is not possible on account of the lack of exact receiver-side separation of the two transmitted signals. This separation thus is not possible on account of the coupling of the transmitting antennas caused by the beamforming. Thus, even in the case of beamforming, the coherent superposition of the two transmitted signals results in a phase distortion, and consequently an erroneous measurement of the two angles.

The angular error to be expected is shown in FIG. 3 by way of example for the antenna spacings $d_r=d_{Tx}=d_{Ty}=\lambda/2=1.9$ mm and an attenuation of 20 dB. Since noise processes were neglected in this simulation, averaging of the phases is omitted. The exact behavior of the error depends on the attenuation and the geometric arrangement of the transmitting antennas.

Depending on the position of the target, measurement errors of up to 15° can arise in both the elevation direction and the azimuth direction. Reflections from ±60° are detected with an error of approximately 4°. The above-described separation of targets in the elevation direction and the range correction are scarcely possible in practical terms on the basis of such measurement errors.

SUMMARY OF THE INVENTION

It is therefore an object of the invention to improve the method for determining the azimuth angle and the elevation angle such that the method provides a sufficiently reliable statement about the azimuth angle and the elevation angle even when exact separation of the two transmitted signals is lacking on account of the MMIC chosen or in the case of beamforming.

In an exemplary embodiment, in order to compensate for a systematic error present because of the lack of exact separation of the two transmitted signals, an error-compensated elevation angle and/or an error-compensated azimuth angle is determined via a compensation after the measurement of the phase differences, or after the measurement of the phase differences and the calculation from the measured phase differences of an azimuth angle or elevation angle that is erroneous because of the lack of separation of the transmitted signals.

The compensation is carried out with the aid of a priori knowledge. The a priori knowledge can be implemented in a variety of ways so that a method according to the invention can be carried out.

For example, the a priori knowledge can be implemented in the form of values stored in a memory. The values can form a lookup table.

It is also possible for the a priori knowledge to be implemented in the form of an equation or multiple equations, which are used to calculate a compensated elevation angle and/or azimuth angle. The a priori knowledge can be contained in coefficients of the equations, among other things.

It is possible for the phase differences to be variables of one or more compensation equations. It is also possible for the phase differences to be input quantities for lookup of compensated values in a lookup table.

It is likewise possible for the phase differences to be used initially for calculating an erroneous elevation angle and/or an erroneous azimuth angle, for example by means of Equations (1) and (2). This erroneous angle or angles can then be variables of equations for calculating one or more compensation values and/or input quantities for lookup of compensated values in a lookup table.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

According to an exemplary embodiment, the errors of the azimuth angle and/or of the elevation angle are reduced iteratively.

In a first step of the iterative method, first erroneous uncompensated azimuth angles $\Phi^0_A$ and elevation angles $\Phi^0_E$ are determined from the measurements $\Delta\varphi_1$, $\Delta\varphi_2$, the values $d_{Tx}$, $d_R$, $d_{Ty}$ determined by the antenna array, and the wave number k of the electromagnetic wave, with the aid of the above-mentioned Equations (1) and (2).

With the aid of a priori knowledge, a first compensation value $K(\Phi^0_A, \Phi^0_E)$ is then determined. The determination of the first compensation value is accomplished by means of a calculation or by readout from a memory in which a lookup table can be stored.

Using the compensation value $K(\Phi^0_A, \Phi^0_E)$, a first compensated elevation angle $\Phi^1_E$ is then calculated with the following equation:

$$\Phi^i_E = \Phi^0_E + K(\Phi^{i-1}_A, \Phi^{i-1}_E) \quad (4)$$

The associated compensated azimuth angle $\Phi^i_A$ is then determined from the equation derived from Equation (2):

$$\Delta\varphi^i_A = \frac{\Delta\varphi_1}{\cos(\Phi^i_E)} \rightarrow \Phi^i_A = \sin^{-1}\left(\frac{\Delta\varphi^i_A}{kd_R}\right) \quad (5)$$

The compensated elevation angle calculated with the first compensation value and the first compensated azimuth angle calculated therewith are still erroneous. They can be used as input quantities for a second compensation step in which a second compensation value is determined through a second calculation or a second readout from a memory.

Using the second compensation value, the second compensated elevation angle can then be calculated using Equation (4). The second compensated azimuth angle then results from use of Equation (5). Further compensation steps can follow.

The method can be continued iteratively until the error is minimized such that further processing of the compensated azimuth angles and elevation angles is then reasonably possible.

Figure 7A:
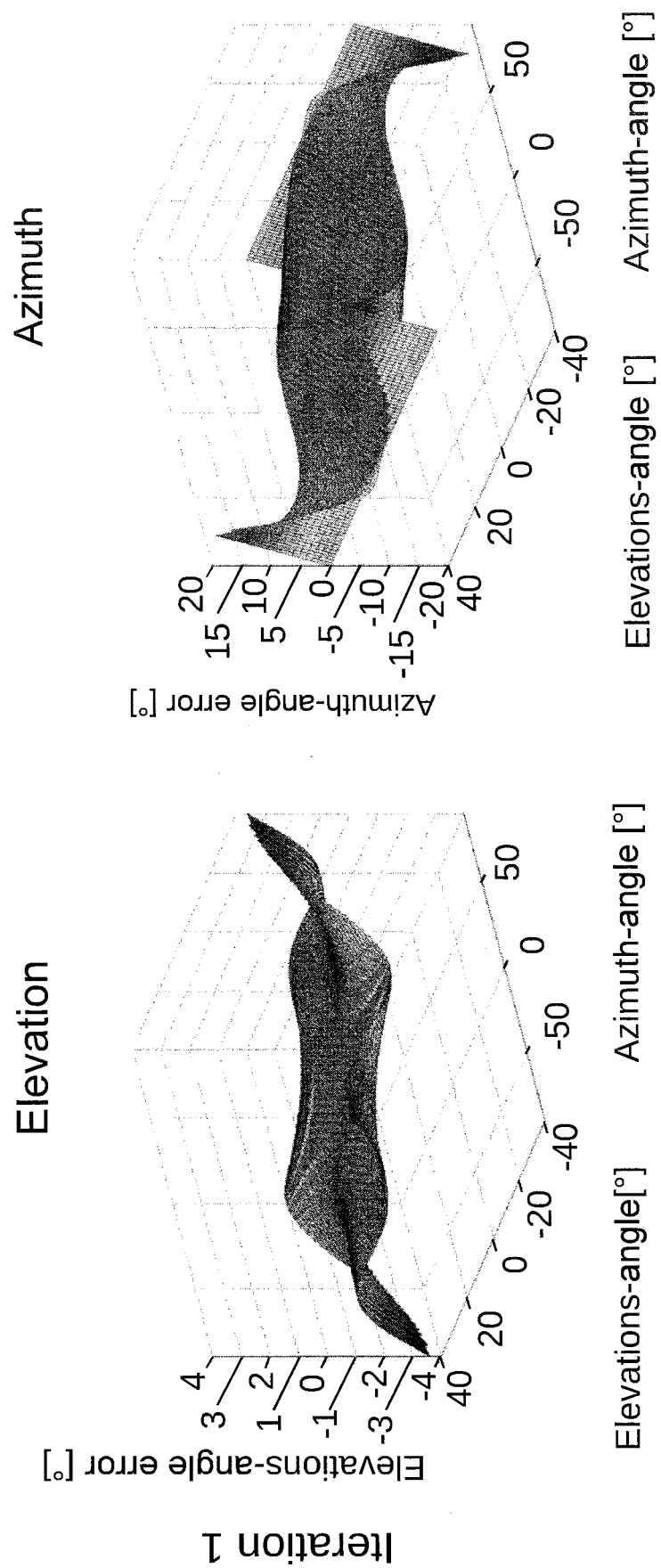
FIGS. 7a to 7c show the systematic estimation error in compensation from the first method according to the invention.
Figure 7B:
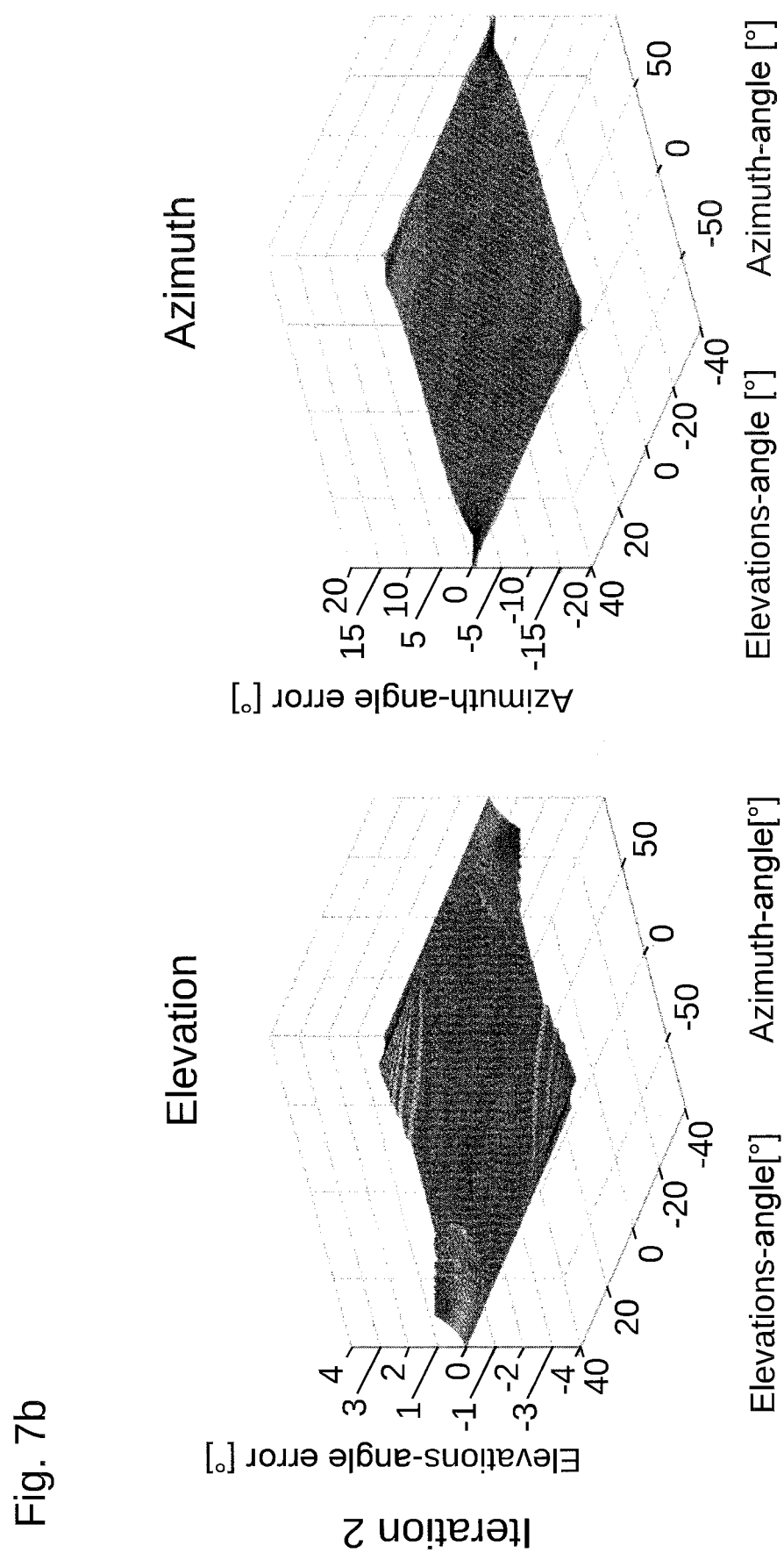
Figure 7C:
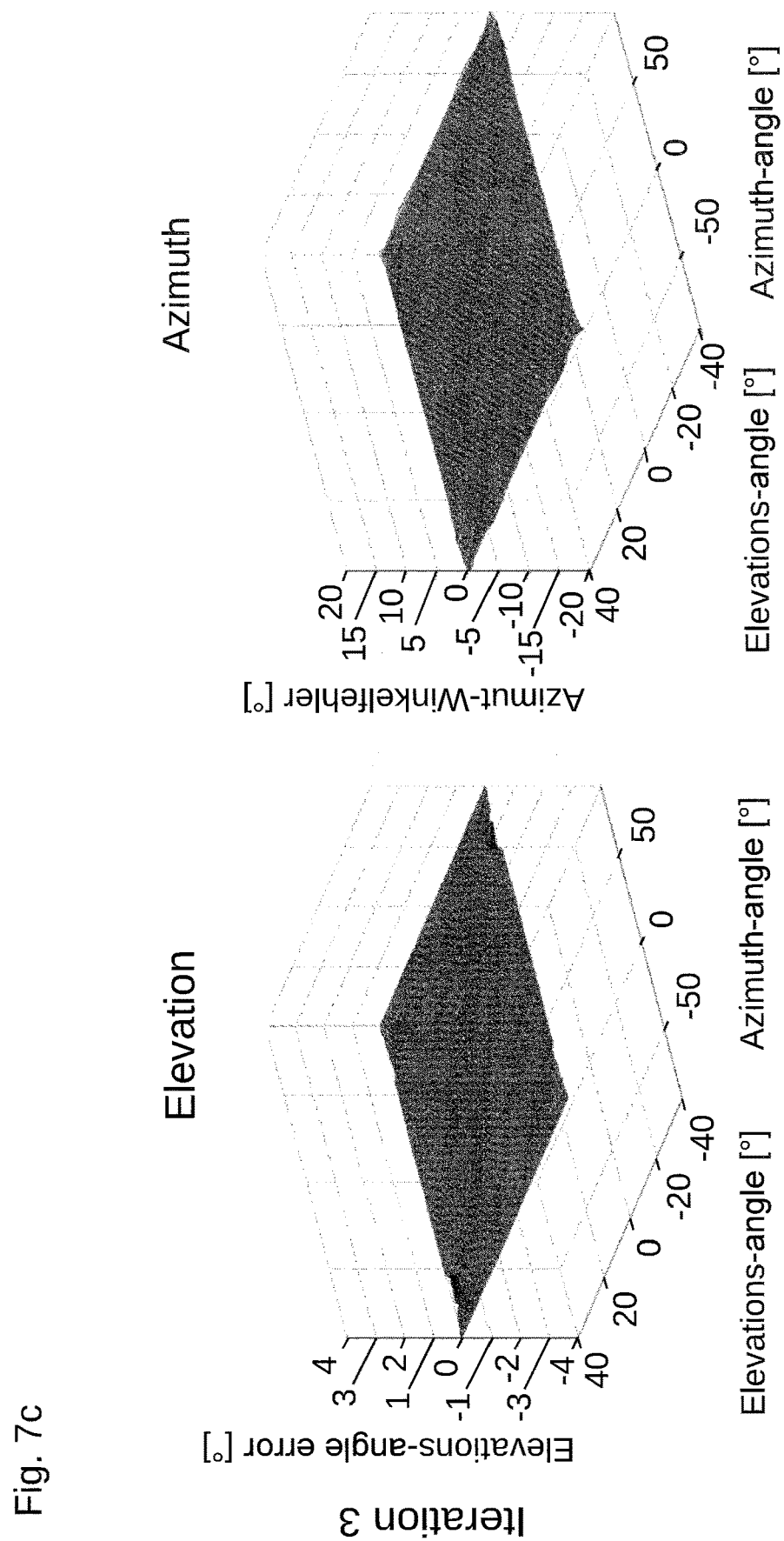

It has been demonstrated in an investigation that even two iterations are sufficient to largely compensate the systematic estimation error resulting from the coupling of the transmitting antennas. This is shown in FIGS. 7a to 7c.

According to another exemplary embodiment, an erroneous elevation angle and an erroneous azimuth angle are first calculated from the measured phase differences by means of Equations (1) and (2). These erroneous quantities are used as input quantities for reading a compensated elevation angle out of a memory in which a lookup table can be stored. A compensated azimuth angle is then determined by means of the compensated elevation angle and the of Equation (2).

The lookup table from which the compensated elevation angle can be read is based on measurements. For this purpose, a space around the antenna array can be sampled as finely as possible with the aid of a strong reflector, for example, which means that the reflector is displaced between two samples by an angular amount in height (elevation) or in the plane (azimuth). From the phase differences $\Delta\varphi_1$, $\Delta\varphi_2$ measured in this process, erroneous elevation angles $\hat{\Phi}_E$ and azimuth angles $\hat{\Phi}_A$ based on the measurements are calculated by means of Equations (1) and (2). The actual elevation angle of the measurement arrangement can be uniquely assigned to these erroneous angles. This assignment of the erroneous elevation angle $\hat{\Phi}_E$ and the erroneous elevation azimuth angle $\hat{\Phi}_A$ to the actual elevation angle is then stored in the lookup table.

Figure 1:
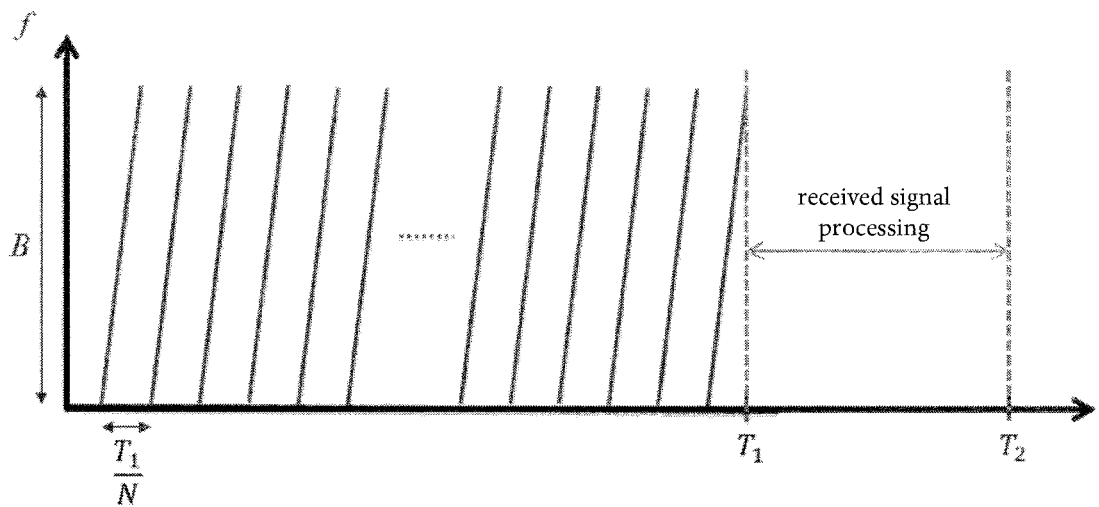
FIG. 1 shows a conventional linear frequency-modulated continuous wave radar signal.
Figure 2:
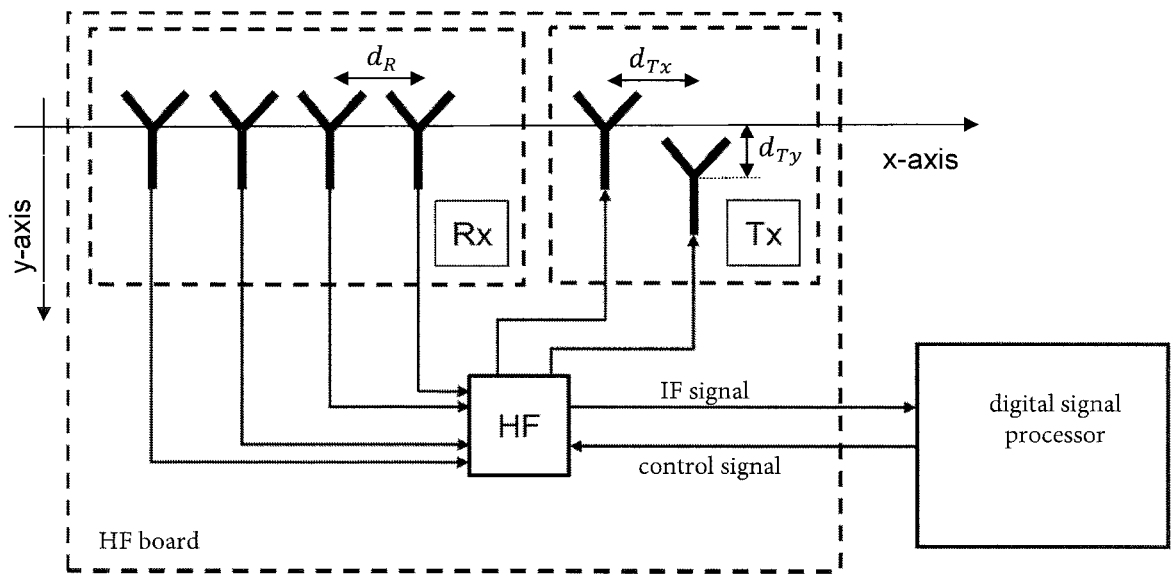
FIG. 2 shows a conventional antenna array in a schematic representation.
Figure 3B:
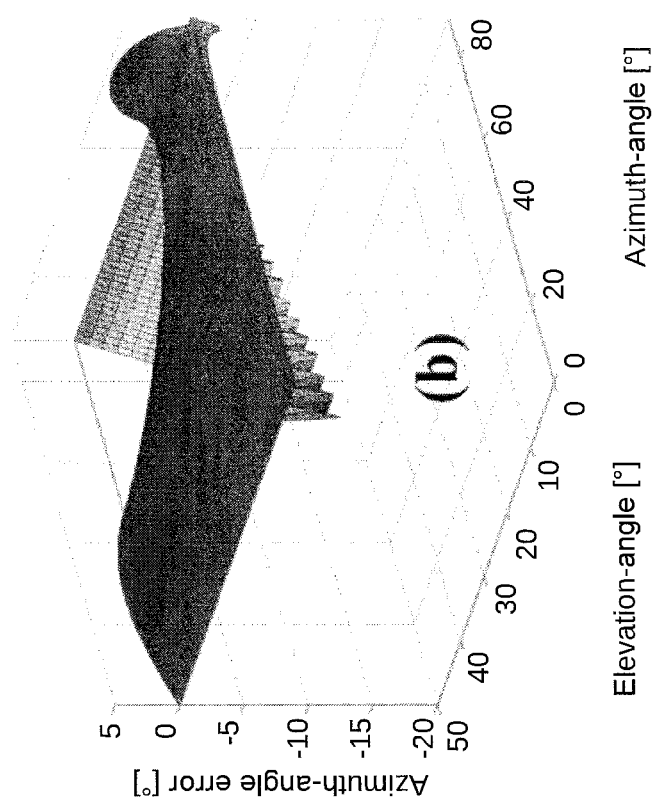
FIGS. 3a and 3b show systematic errors of the elevation angle and of the azimuth angle without compensation.
Figure 3A:
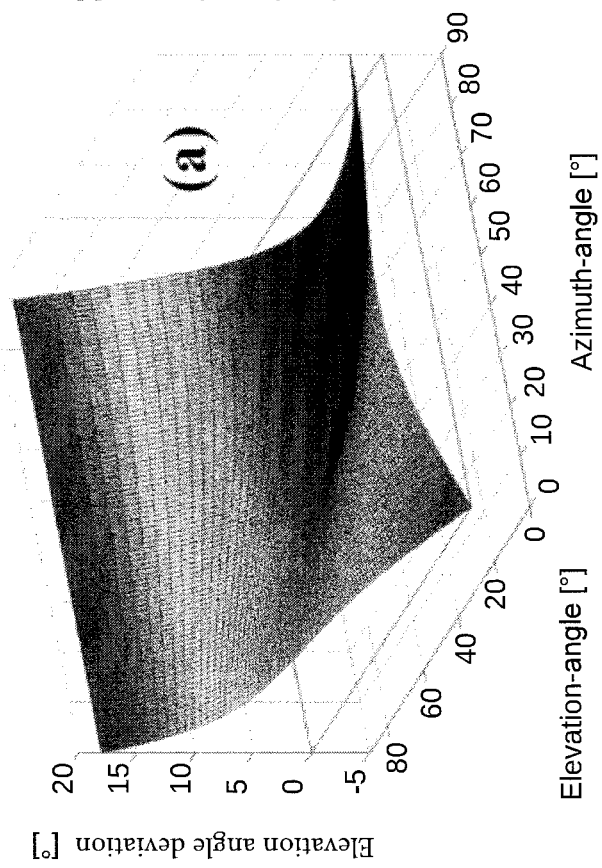
Figure 4:
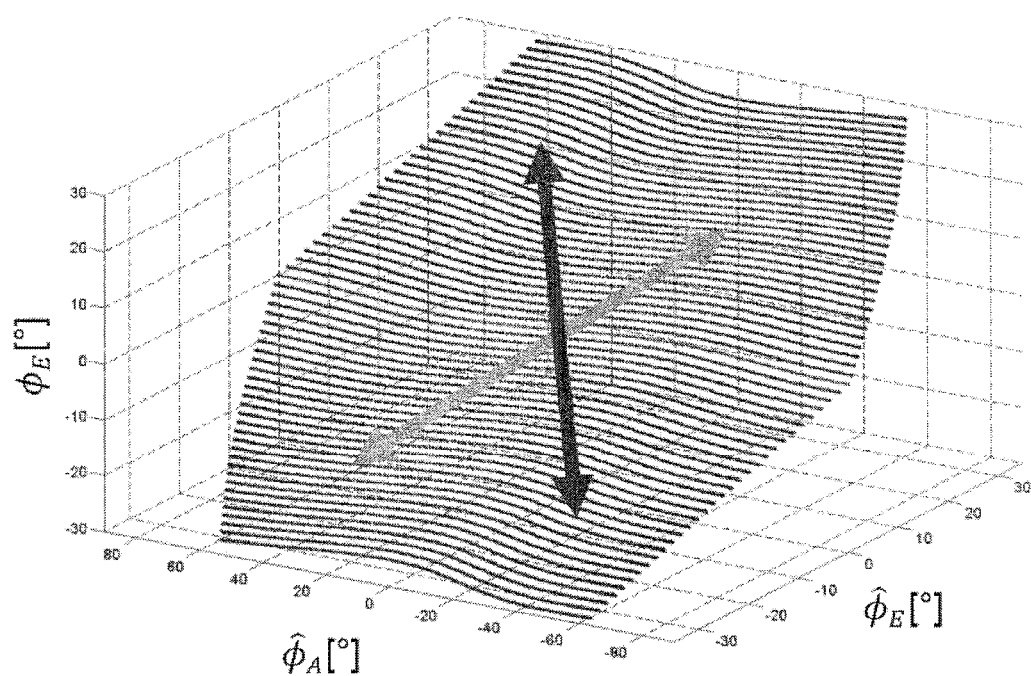
FIG. 4 shows a dependence of the actual elevation angle on the erroneous elevation angle $\hat{\Phi}_E$ and the erroneous azimuth angle $\hat{\Phi}_A$.

The dependence of the actual elevation angle on the erroneous elevation angle $\hat{\Phi}_E$ and the erroneous elevation azimuth angle $\hat{\Phi}_A$ is shown graphically in FIG. 4.

A A

If erroneous elevation angles $\hat{\Phi}_E$ and azimuth angles $\hat{\Phi}_A$ are produced later based on the measurement of the phase differences $\Delta\varphi_1$, $\Delta\varphi_2$, the actual elevation angle can be read out of the lookup table stored in a memory. The actual azimuth angle can then be determined by means of Equation (2).

The measurements for determining the lookup table can be carried out for each antenna array, for example during a so-called EOL calibration. The measurement is then independent of production and component tolerances. However, great calibration effort is then required.

Alternatively, measurements could also be performed on a sample of antenna arrays, the results of which are then applied to all antenna arrays.

A lookup table is shown graphically in FIG. 4.

The single-valued region in the elevation direction has been chosen as +/−30°, which is to say 60°. It is evident in FIG. 4 that a symmetry is present in the opposite quadrants. This can be used to reduce the memory requirement. Since the table thus generated contains only discrete values, the determination of correction values at intermediate points takes place through interpolation, for example through linear interpolation.

Despite the utilization of symmetry, a large memory is nonetheless necessary in order to store the lookup table with adequate accuracy.

Figure 5:
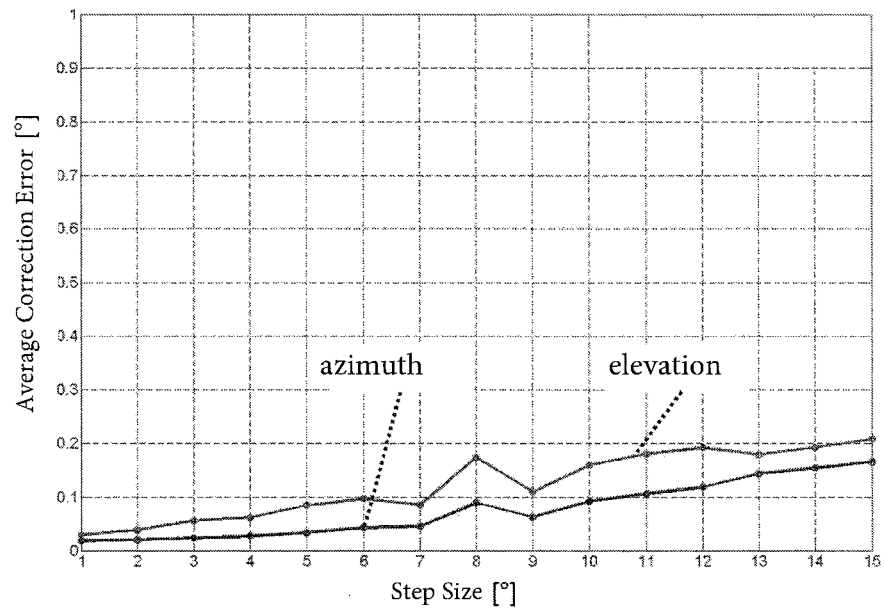
FIG. 5 shows the average correction error for various step sizes in the second method according to the invention.

For example, if one assumes an angular resolution (step size) of 1° in the azimuth and elevation angle directions, and a 16-bit quantization of the values, i.e., 2 bytes per value, then with an angular range of +/−30° for elevation and +/−90° for the azimuth angle, the result is a memory requirement of 180*60/2*2 bytes=10.8 Kbytes. If one reduces the resolution from 1° to 5°, the memory requirement can be reduced to 432 bytes at the expense of accuracy. The average correction factor for various step sizes is shown in FIG. 5.

In another exemplary embodiment, the dependence of the actual elevation angle on the erroneous elevation angle $\hat{\Phi}_E$ and the erroneous azimuth angle $\hat{\Phi}_A$, as is graphically represented in FIG. 4, is approximated by a polynomial. The coefficients that are obtained through this approximation can be stored in a memory. This will generally take place once during setup of the antenna array. The coefficients and the polynomial constitute the a priori knowledge that is used in the third method for compensation of the error.

Figure 6A:
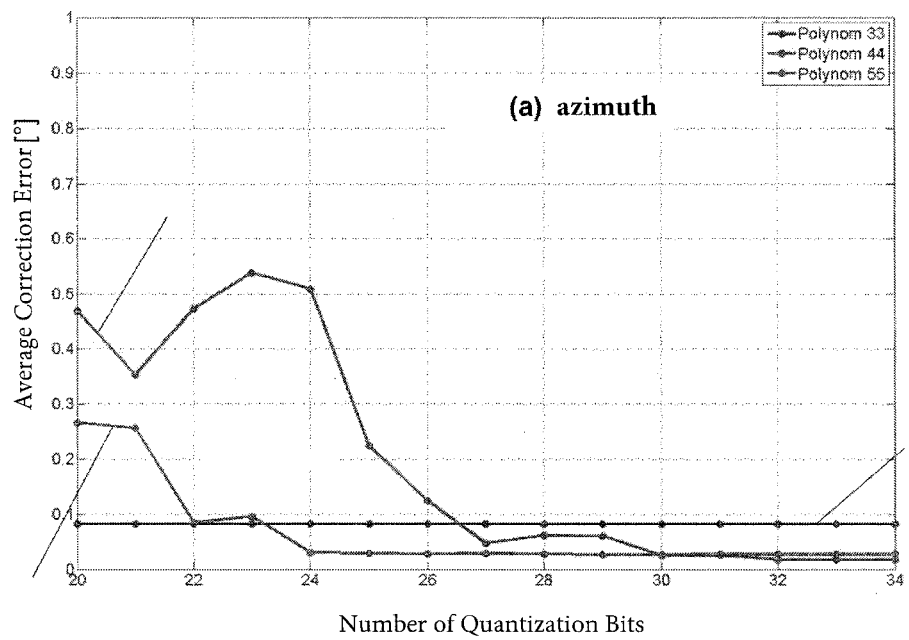
FIGS. 6a and 6b show the dependence of the accuracy of the approximation from the third method according to the invention on the quantization of the coefficients and the order of the polynomial.
Figure 6B:
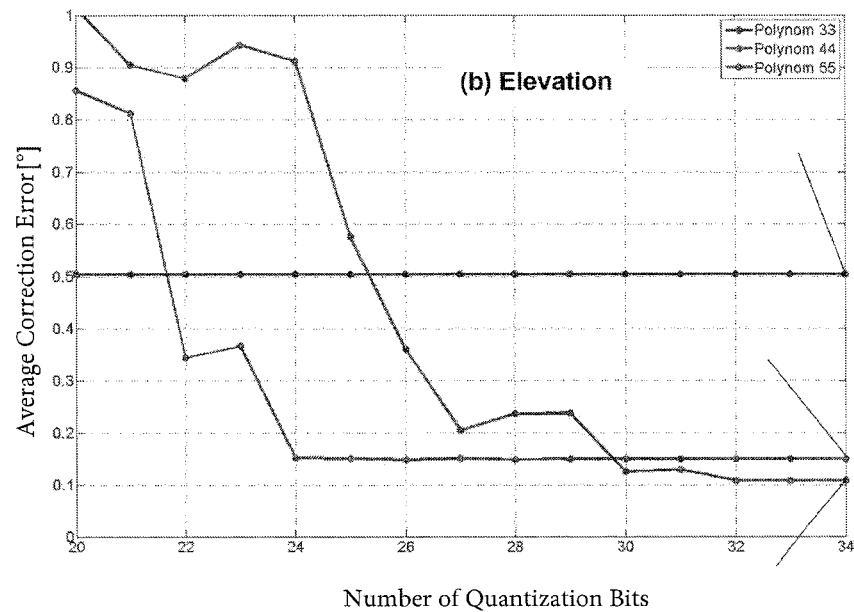

It has been shown that the accuracy of the determination of the coefficients, in particular the quantization and the order of the polynomial selected for the approximation, has a great effect on the quality of the approximation (see FIG. 6). In order to achieve a sufficiently accurate approximation, the inventor proposes a $5^{th}$ order polynomial for the two variables of the polynomial (i.e., in both angular directions), and a 32-bit quantization of the coefficients. This means that 21 coefficients of 32 bits are stored. This results in a memory requirement of approximately 48 bytes (21*4 bytes). The memory requirement is reduced by approximately 90% as compared to the second method with 5° angular resolution. However, this comes at the expense of an increased computing load for every raw target, since in this case a $5^{th}$ order polynomial must be evaluated for every raw target, resulting in 70 multiplications and 20 additions.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for measuring an elevation angle and/or an azimuth angle with an antenna array, the antenna array comprising at least two transmitting antennas that have a horizontal and a vertical spacing from one another, at least four receiving antennas that have a horizontal spacing from one another, and a monolithic microwave circuit, the method comprising:

transmitting identical transmitted signals formed of successive linear-frequency-modulated ramps through the transmitting antennas of the antenna array using time division multiplexing, the time division multiplexing being achieved through alternating attenuation of the signals transmitted by the transmitting antennas;

receiving echoes of the transmitted signals by the receiving antennas; and down-converting the received echoes to a baseband and sampling the received echoes;

transforming the down-converted and sampled echoes via an FFT into a 2D image domain;

determining phase differences from the image data; and determining an error-compensated elevation angle and/or an error-compensated azimuth angle via a compensation in order to compensate for a systematic error present because of the lack of separation of the two transmitted signals, the compensation being performed:

after the measurement of the phase differences, or after the measurement of the phase differences and the calculation from the measured phase differences of an azimuth angle or elevation angle that is erroneous because of the lack of separation of the transmitted signals, wherein the phase differences are initially used for calculating an erroneous elevation angle and/or an erroneous azimuth angle, and wherein the erroneous angle or angles are variables of equations for calculating compensated values and/or input quantities for lookup of compensated values in a lookup table.

2. The method according to claim 1, wherein the compensation uses a priori knowledge about the systematic error or its effects.

3. The method according to claim 2, wherein the a priori knowledge is implemented in the form of values stored in a memory.

4. The method according to claim 3, wherein values are entered in a lookup table, from which they are read for the compensation.

5. The method according to claim 2, wherein the a priori knowledge is implemented in the form of an equation or multiple equations, which are used to calculate a compensated elevation angle and/or azimuth angle.

6. The method according to claim 5, wherein the a priori knowledge is contained in coefficients of the equation or equations, among other things.

7. The method according to claim 5, wherein the phase differences are variables of one or more equations.

8. The method according to claim 3, wherein the phase differences are input quantities for lookup of compensated values in a lookup table.

* * * * *